US009451485B2

(12) United States Patent
Sydir et al.

(10) Patent No.: US 9,451,485 B2
(45) Date of Patent: Sep. 20, 2016

(54) DETECTION OF MISLEADING IDENTIFIABLE WIRELESS SIGNAL SOURCES

(71) Applicant: Intel Corporation, Santa Clara, CA (US)

(72) Inventors: Jaroslaw J Sydir, San Jose, CA (US); Anthony G Lamarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/947,453

(22) Filed: Jul. 22, 2013

(65) Prior Publication Data

US 2015/0024734 A1    Jan. 22, 2015

(51) Int. Cl.
    *H04W 24/08*    (2009.01)
    *H04W 48/16*    (2009.01)
    *H04W 64/00*    (2009.01)

(52) U.S. Cl.
    CPC ............ *H04W 24/08* (2013.01); *H04W 48/16* (2013.01); *H04W 64/00* (2013.01)

(58) Field of Classification Search
    USPC ............. 455/456.1, 410, 500, 434; 370/332, 370/338, 252
    See application file for complete search history.

(56) References Cited

U.S. PATENT DOCUMENTS

| 7,916,025 | B2 * | 3/2011 | Locker .............. G08B 13/1427 340/539.11 |
| 8,630,657 | B2 * | 1/2014 | Alizadeh-Shabdiz et al. .......................... 455/456.1 |
| 8,886,230 | B2 | 11/2014 | Sydir et al. |
| 2006/0079183 | A1 | 4/2006 | Song et al. |
| 2008/0139217 | A1 | 6/2008 | Alizadeh-Shabdiz et al. |
| 2011/0306358 | A1 * | 12/2011 | Alizadeh-Shabdiz G01S 5/0278 455/456.1 |
| 2014/0088864 | A1 | 3/2014 | Lamarca et al. |

FOREIGN PATENT DOCUMENTS

| WO | 2010/148260 A1 | 12/2010 |
| WO | 2012/005468 A2 | 1/2012 |
| WO | 2012/053791 A2 | 4/2012 |
| WO | 2015/013121 A1 | 1/2015 |

OTHER PUBLICATIONS

International Search report with Written Opinion received for PCT Patent Application No. PCT/US2014/047140, mailed on Nov. 5, 2014, 12 pages.
International Preliminary Report on Patentability and Written Opinion Received for PCT Patent Application No. PCT/ US2014/ 047140, mailed on Feb. 4, 2016, 7 pages.

* cited by examiner

*Primary Examiner* — Vladimir Magloire
*Assistant Examiner* — Majid Syed
(74) *Attorney, Agent, or Firm* — Forefront IP Lawgroup, PLLC

(57) ABSTRACT

Disclosed herein are technologies for detecting misleading identifiable wireless signal (IWS) sources by a mobile device. When a mobile device attempts to estimate its location or route based upon ambient IWS sources, such estimations presume that the ambient IWS sources are unique, stationary, and relatively short ranged. A misleading IWS source is one that does not adhere to one or more of those presumptions. This Abstract is submitted with the understanding that it will not be used to interpret or limit the scope or meaning of the claims.

19 Claims, 6 Drawing Sheets

DETECTION OF MISLEADING IDENTIFIABLE WIRELESS SIGNAL SOURCES

BACKGROUND

The use of mobile devices, such as smartphones, is nearly ubiquitous. Many of these mobile devices include the capability to determine their geo-physical (e.g., geographic) location. That is, the mobile device is capable of determining its location in the real world. Conventionally, location determination is typically accomplished by using Global Positioning Systems (GPS), some form of telemetry based upon multiple radio signals (e.g., cellular), internet protocol (IP) geo-location, or some combination thereof.

A collection of so-called location-based services (LBSs) are emerging that take advantage of the location-awareness capability of the mobile devices that so many people are carrying with them each day. For example, LBSs include targeted advertising, social networking, locating friends ("check-ins"), photo-tagging, life-logging, location-based games, fitness monitoring, etc. LBS may include vehicle or parcel tracking as well.

Using the location-detection capability of mobile devices, some LBSs offer destination or estimated-time-of-arrival (ETA) prediction. Such predictions may be useful to avoid congestion, identify convenient and interesting waypoints (e.g., a gas station, coffee shop, etc.), coordinate arrival with other people, and the like. GPS technology is the most common technology utilized for conventional ETA prediction.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1A:
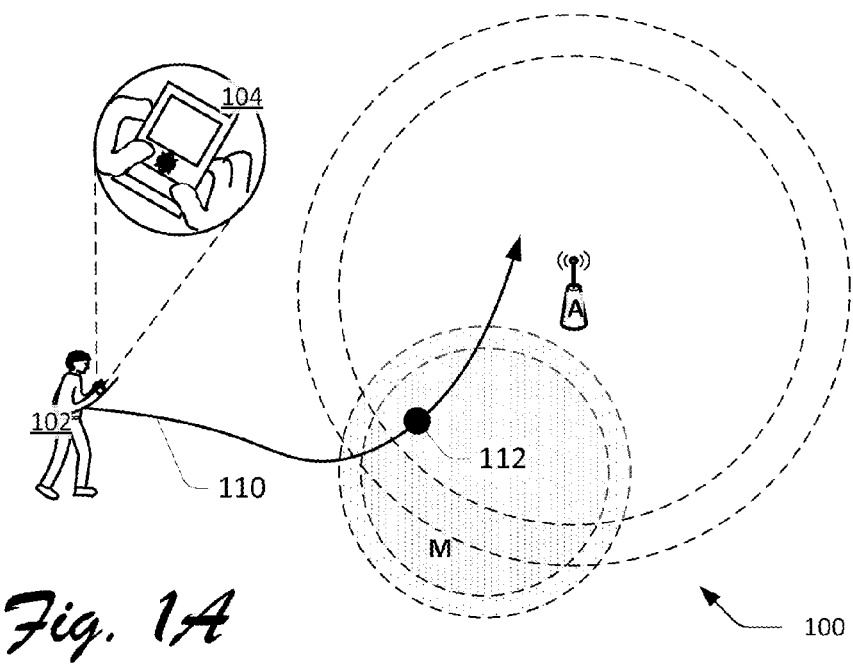
FIGS. 1A, 1B, and 2 show example scenarios in which implementations in accordance with the description herein may be used.

Disclosed herein are technologies for detecting misleading identifiable wireless signal (IWS) sources by a mobile device. When a mobile device attempts to estimate its location or route based upon ambient IWS sources, such estimations presume that the ambient IWS sources are unique, stationary, and relatively short ranged. A misleading IWS source is one that does not adhere to one or more of those presumptions.

With the technology described herein, misleading IWS sources are effectively determined and blacklisted. A mobile device performs location or route estimation based upon ambient IWS sources. In accordance with the technology described herein, the misleading IWS sources are not considered when location or route estimation is performed.

The technology described herein may be used along with existing techniques to detect and blacklist misleading IWS sources. The mobile device can maintain this blacklist locally or it can be maintained via a centralized or distributed system.

Location Awareness

Location awareness involves a mobile device determining its present location. Conventional location-determination approaches include GPS and Wi-Fi and cellular signal positioning (e.g., triangulation, trilateration, and other forms of interpolation and extrapolation) to determine geo-physical location relative to multiple signal sources. GPS provides near-ubiquitous location coverage outdoors and a GPS enabled typical smartphone can estimate its location with three to five meter accuracy. For signal positioning, the signal sources can use cellular or a variant of IEEE 802.11 (i.e., Wi-Fi). Signal-positioning approaches rely upon a map of signal sources whose locations are known to infer a location of a device.

Conventional approaches rely upon determination of physical or geophysical location to estimate route, predict destination, and calculate estimated time of arrival ("ETA"). The technology described herein is particularly applicable to location-awareness approaches that are based upon the "observed" ambient radio environment.

One or more implementations include, for example, a mobile device estimating location or route based on the "observed" ambient radio environment at that location or along that route. In particular, the mobile device can track which ambient identifiable wireless ("IWS") sources are part of a topography within reception range at discrete locations.

A wireless access point (WAP) is a specific example of an ambient IWS source. A suitable WAP is compliant with one of the IEEE (Institute of Electrical and Electronics Engineers) 802.11x standards (where x designates one of the present or future standards such as 802.11g). The IWS sources are called ambient herein because they may be detected or "observed" in the environment while a mobile device moves about the world. The IWS sources are called "identifiable" because each is presumably uniquely identifiable. For example, its basic service set identification (BSSID) or media access card (MAC) address may presumably uniquely identify each WAP. Of course, other identifying characteristics may be used alone or in combination with each other or with the BSSID or MAC address. Examples of such other identifying characteristics include service set identification (SSID) and received signal strength indication (RSSI). However, as will be discussed later, the presumed uniqueness of identity of IWS sources does not always hold true.

Presumptions of Wi-Fi Location Estimation

Wi-Fi-based location approaches offer reduced power consumption over more traditional techniques such as those based upon Global Positioning System (GPS). Wi-Fi-based location estimation approaches rely upon three presumptions about a WAP (which is an example of a IWS source):

Unique Identifier: It is presumed that each WAP has a unique BSSIDs or MAC addresses. Wi-Fi-based location systems use the BSSIDs as the presumed unique identifier in their map or database of WAPs.

Stationary: It is presumed that WAPs are stationary and once mapped will not be observed in different physical place.

Predictable range: It is presumed that WAPs have relatively short range. Typically, the range is less than 150 feet. Sometimes, the range can extend to as much as 300 feet.

Although the vast majority real-world WAPs conform to these assumptions, not all do. Indeed, WAPs that fail to conform to these assumptions appear to be a growing trend. It is becoming increasingly more common to encounter WAPs that are mobile, duplicates, or high-powered.

Some WAPs are mobile. Mobile WAPs are becoming more and more prevalent on buses, trains, and other forms of transportation. More significantly, more and more devices that have both Wi-Fi and cellular interfaces are being configured to emulate an 802.11-type WAP. Indeed, some cellular/Wi-Fi enabled devices are dedicated to operate as a so-called "personal Wi-Fi hotspot."

In addition, some WAPs have duplicate identifiers. In other words, the identifiers of WAPs are not unique. Typically, WAPs are identified by their BSSID or MAC addresses, which were presumed to be globally unique. However, many WAPs have modifiable BSSIDs. Therefore, many physically distinct WAPs may have the same BSSID. Indeed, some MAC addresses can be duplicated.

Furthermore, in order to increase the reach of access to wireless network, an increasing number of WAP are configured to have long ranges. These long-range WAPs may be both high-powered and mounted high, such as on a tower. These long-range WAPs often boast a range of one, two, or more kilometers. These WAPs have a range that is out of the norm of a typical WAP. Indoors, the typical range is 150 feet. Outdoors, the typical range is 300 feet.

Since these mobile, duplicate, long-range WAPs do not adhere to the presumptions of Wi-Fi-based location estimation techniques, these WAPs mislead such location estimations. Consequently, such WAPs are called "misleading" or "invalid" WAPs (or IWS sources) herein.

For example, some location estimation approaches rely on trilateration. These approaches depend on an accurate database of WAPs whose actual location has been captured and recorded. The databases for these systems are commonly populated through a technique referred to as war driving. This involves Wi-Fi scanners and GPS devices being used to capture the WAPs observed at each location and associate them with the geo-coordinates recorded at that location. The accuracy of these types of approaches depends on the accuracy and completeness of their database. High accuracy in location estimation will be difficult to achieve with misleading WAPs in their databases.

Other location estimation approaches use Wi-Fi "fingerprinting" to map WAPs and their signal strengths. Such approaches are extremely sensitive to the presence of misleading WAPs. At best, misleading WAPs wreak havoc with the accuracy of Wi-Fi fingerprint-based location estimation.

Still other location estimation approaches track semantic locations based upon learning patterns of observance of WAPs. Like trilateration approaches, the accuracy of semantic location approaches is challenged by misleading WAPs.
Groups of IWS Sources The technology described herein detects misleading IWS sources that are encountered along with a larger number of other IWS sources that are well behaved. That is, the well-behaved IWS sources adhere the presumptions of being stationary, unique, and low-range. In other words, well-behaved IWS sources are valid.

If the world had a uniform density of IWS sources, then simply counting the number of IWS sources with which each IWS source is observed might be an effective way to identify misleading IWS sources. Under this uniform density condition, misleading IWS sources would appear misplaced.

Of course, the density of IWS sources is anything but uniform in the real world. Thus, simply counting the number of IWS sources with which each IWS source is observed is not a reliable way to identify misleading IWS sources. IWS-source density varies greatly from place to place.

To illustrate how merely counting the number of IWS sources that are co-observed is insufficient in the real world, consider these examples: a corporate campus and a short drive. At a high-technology corporate campus, a mobile device may encounter forty or more distinct IWS sources at any specific time and place. Each of these IWS sources is observed with 40+ IWS sources, yet, in this example, none of these sources is mobile or otherwise misleading. Conversely, a mobile device may encounter a single mobile IWS source during a short drive. That is, the mobile IWS source—which is by definition misleading—is encountered with far less than forty IWS sources. Consequently, a simple co-observation count is not helpful in identifying a misleading IWS source.

Instead, the technology described herein determines whether a particular IWS source is misleading by tracking the number of distinct groups or clusters of IWS sources with which that IWS source is co-observed. A group or cluster of IWS sources is a list of the IWS source that are observed at the same time (i.e., co-observed). That is, a group includes the IWS sources detected and identified during a wireless scan for ambient IWS source.

A mobile device updates historical data records for each known IWS source based upon recently observed IWS sources. For example, the records may be updated after each scan for ambient IWS sources. This historical data record measures the magnitude of co-observances across known IWS sources. To determine if a IWS source is misleading, these operations are performed:

For each WAP, that a mobile device observes a time period:

$N_i$=set of WAPs that each WAP ($WAP_i$) was seen with in a single scan (e.g., observation)

$C_i$=maximum number of WAPs that each WAP ($WAP_i$) was seen with in a single scan $S_i$=sum across all WAPs in $N_i$ of $1/C_i$ If $S_i$>MAX_CLUSTERS add $WAP_i$ to the AP black list Operation Table 1

In reality, there is a limit to the number of groups with which a valid IWS source will reasonably be observed. That limit may be a fixed or adjustable threshold. That threshold is MAX_CLUSTERS in Operation Table 1. The MAX_CLUSTERS value may be called the validity threshold. Any IWS source that have been seen with too many groups are considered misleading and are disregarded (i.e., blacklisted). Conversely, IWS sources that have not been seen with too many groups are considered valid.

It is contemplated that the MAX_CLUSTERS setting will be adjustable on the mobile device. Real world experience will inform what value works best in the actual environment in which the mobile device is used. A setting in the range of six to ten is likely to find a good compromise between false positives and missing negatives.

When generating a map based upon ambient IWS sources, the misleading IWS sources are not included. When performing location estimation based upon ambient IWS sources, the misleading IWS sources are not considered in that estimation.

Example Scenarios

Figure 1B:
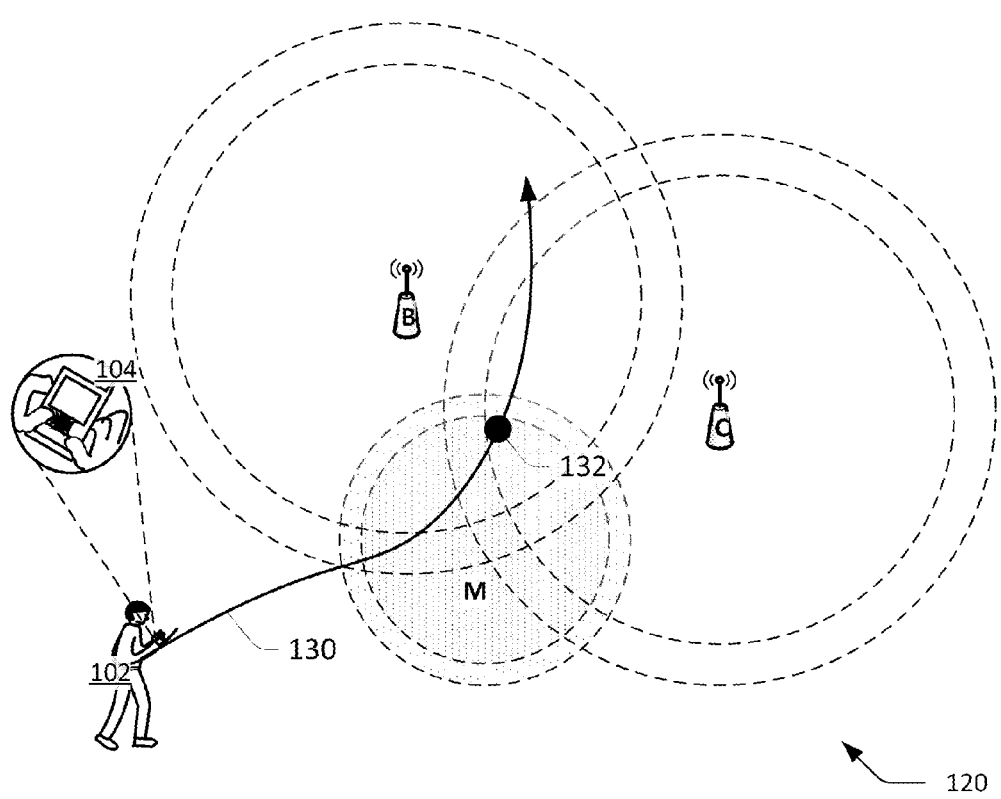
Figure 2:
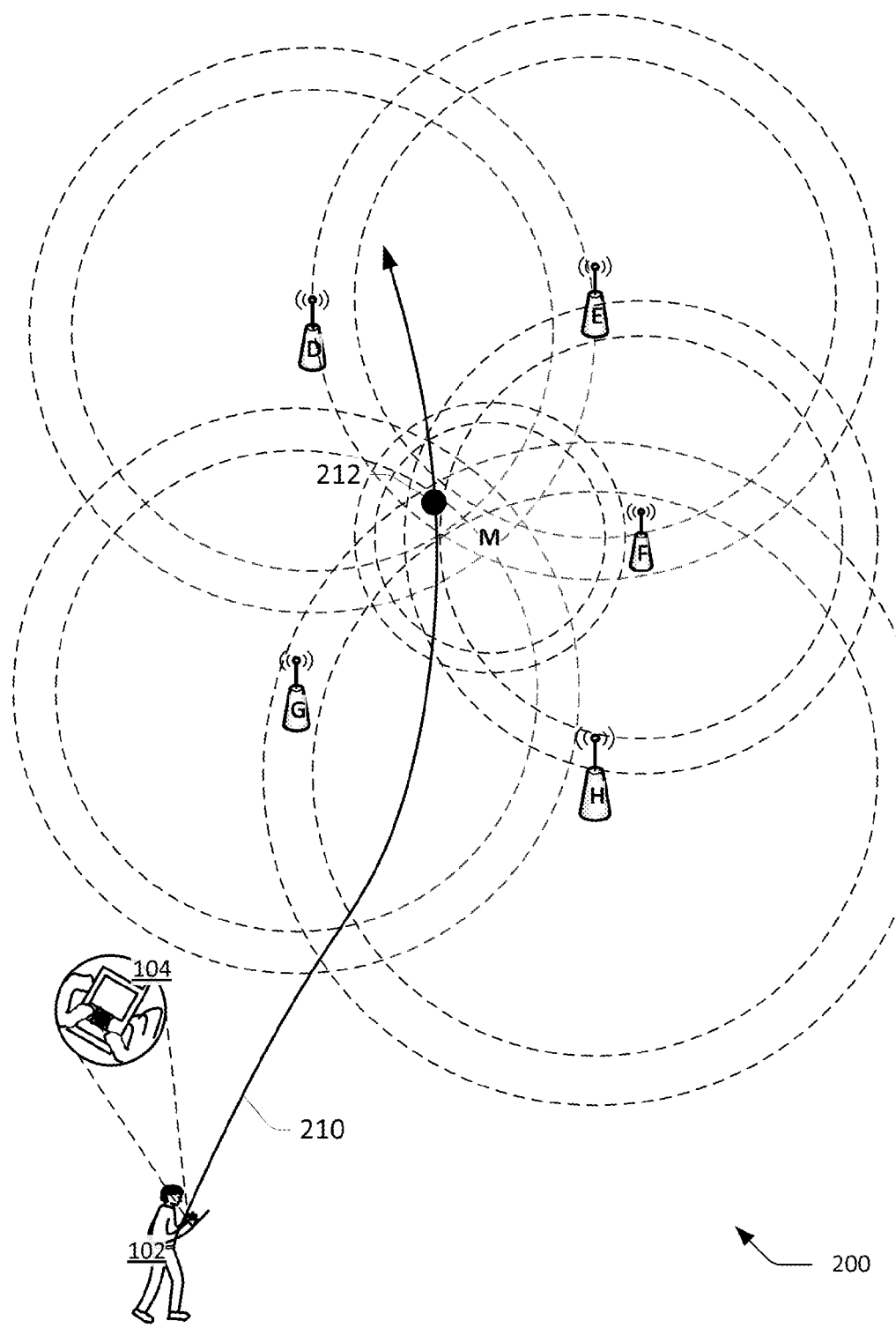

FIGS. 1A, 1B, and 2 includes example scenarios that illustrate how misleading IWS sources can be detected and blacklisted employing one or more implementations of the technology described here.

FIG. 1A shows an example scenario 100 that shows a simplified two-dimensional interaction between a mobile device and ambient IWS sources. Scenario 100 includes a user 102 with an active mobile device 104 (e.g., a smartphone) traveling along a path 110. While the user 102 is traveling along the path 110, the mobile device 104 encounters multiple ambient IWS sources. As depicted, the encountered IWS sources include WAP A and mobile WAP M. A dashed double-lined circle indicates the range of each depicted WAP.

With at least one implementation, ambient IWS sources are tracked when the mobile device 104 is active. Of course, when the user 102 is stationary, the ambient IWS sources do not change or at least varies little. However, when the user 102 travels (with the mobile device 104) new IWS sources are noted along the travel path. For example, the user may be walking, running, in a motor vehicle, train, or some via some other sort of ground transport.

As depicted in FIG. 1A, the user 102 travels along path 110 and through the wireless range of WAP A and mobile WAP M. Presume that at point 112 on that path 110 that the mobile device 104 scans for ambient IWS sources. At point 112, the mobile device 104 will observe both WAP A and mobile WAP M because both are within range. The mobile device 104 detects and identifies the WAPs.

In accordance with Operation Table 1, the mobile device 104 determines that $N_A$ is M and $N_M$ is A. The mobile device 104 determines that $C_A$ is 1 and $C_M$ is 1. The mobile device 104 determines that $S_A$ is 1/1, which is 1. Similarly, $S_M$ is 1. For illustration purposes, presume that MAX_CLUSTERS is two, then the device determines that neither WAP A nor WAP M are misleading because neither $S_A$ nor $S_M$ are greater than two. The value of two here is selected merely for discussion purposes. As will noted later in this document, this value is typically larger than two. At this point, it is presumed that both WAP A and WAP M have been co-observed in the same group.

FIG. 1B shows an example scenario 120 that shows a simplified two-dimensional interaction between the mobile device and ambient IWS sources. Scenario 120 includes the user 102 with the active mobile device 104 (e.g., a smartphone) traveling along a path 130. While the user 102 is traveling along the path 130, the mobile device 104 encounters multiple ambient IWS sources. As depicted, the encountered IWS sources include WAP B, and WAP C, and mobile WAP M. Mobile WAP M of example scenario 120 is the same WAP M of example scenario 100.

As depicted in FIG. 1B, the user 102 travels along path 130 and through the wireless range of WAP B, WAP C, and mobile WAP M. Presume that at point 132 on that path 130 that the mobile device 104 scans for ambient IWS sources. At point 132, the mobile device 104 will observe WAP B, WAP C, and mobile WAP M because all are within range. The mobile device 104 detects and identifies the WAPs.

In accordance with Operation Table 1, the mobile device 104 determines that $N_B$ is C and M, $N_C$ is B and M, and $N_M$ is A, B and C. The mobile device 104 determines that $C_B$ is 2, $C_C$ is 2, and $C_M$ is 2. The mobile device 104 determines that $S_B$ is 1/2+1/2, which is 1. $S_C$ is the same. However, $S_M$ is 1/1 (for WAP A), 1/2 (for WAP B), and 1/2 (for WAP C), which is 2.

So, at this point, WAPs A, B, and C are presumed to have been seen in just one group. However, WAP M is presumed to have been seen in two groups because $S_M$ is 2. If MAX_CLUSTERS is two, then the device determines that WAP A, WAP B, WAP C, and WAP M are misleading because none of their S values is greater than two.

FIG. 2 shows an example scenario 200 that shows a simplified two-dimensional interaction between the mobile device and several ambient IWS sources. Scenario 200 includes the user 102 with the active mobile device 104 (e.g., a smartphone) traveling along a path 210. While the user 102 is traveling along the path 210, the mobile device 104 encounters multiple ambient IWS sources. As depicted, the encountered IWS sources include WAP D, WAP E, WAP F, WAP G, WAP H, and mobile WAP M. Mobile WAP M of example scenario 200 is the same WAP M of example scenarios 100 and 120.

As depicted in FIG. 2, the user 102 travels along path 210 and through the wireless range of WAP D, WAP E, WAP F, WAP G, WAP H, and mobile WAP M. Presume that at point 212 on that path 210 that the mobile device 104 scans for ambient IWS sources. At point 212, the mobile device 104 will observe WAP D, WAP E, WAP F, WAP G, WAP H, and mobile WAP M because all are within range. The mobile device 104 detects and identifies the WAPs.

In accordance with Operation Table 1, the mobile device 104 determines the following:

$N_D$ is E, F, G, H, and M;
$N_E$ is D, F, G, H, and M;
$N_F$ is E, D, G, H, and M;
$N_G$ is E, F, D, H, and M;
$N_H$ is E, F, G, D, and M; and
$N_M$ is A, B C. E, F, G, and H.

Consequently, the mobile device 104 determines that $C_D$ is 5, $C_E$ is 5, $C_F$ is 5, $C_G$ is 5, $C_H$ is 5, and $C_M$ is 5. The mobile device 104 determines that S value for WAPs D through H is 1 because they have only been seen with one group. However, $S_M$ is 1/1 (for WAP A), 1/2 (for WAP B), 1/2 (for WAP C), 1/5 (for WAP D), 1/5 (for WAP E), 1/5 (for WAP F), 1/5 (for WAP G), and 1/5 (for WAP H), which is 3.

So, at this point, WAPs A through H are presumed to have been seen in just one group. However, WAP M is presumed to have been seen in three groups because $S_M$ is 3. If MAX_CLUSTERS is two, then the device determines that WAP M is misleading because $S_M$ is greater than two.

As described herein, the misleading WAP (i.e., M) of example scenarios 100, 120, and 200 are mobile. However, the misleading WAP (i.e., M) may be a duplicate of another WAR As such, the operation of the technology in the context of example scenarios 100, 120, and 200 would be alike the description provided above.

Similarly, the misleading WAP (i.e., M) may be a long-range WAP. For example, all the places of example scenarios 100, 120, and 200 might be within one or two kilometers of each other. If so, the WAP M might be a powerful WAP blasting across all the areas and similarly be detected in three clusters.

Example System

Figure 3:
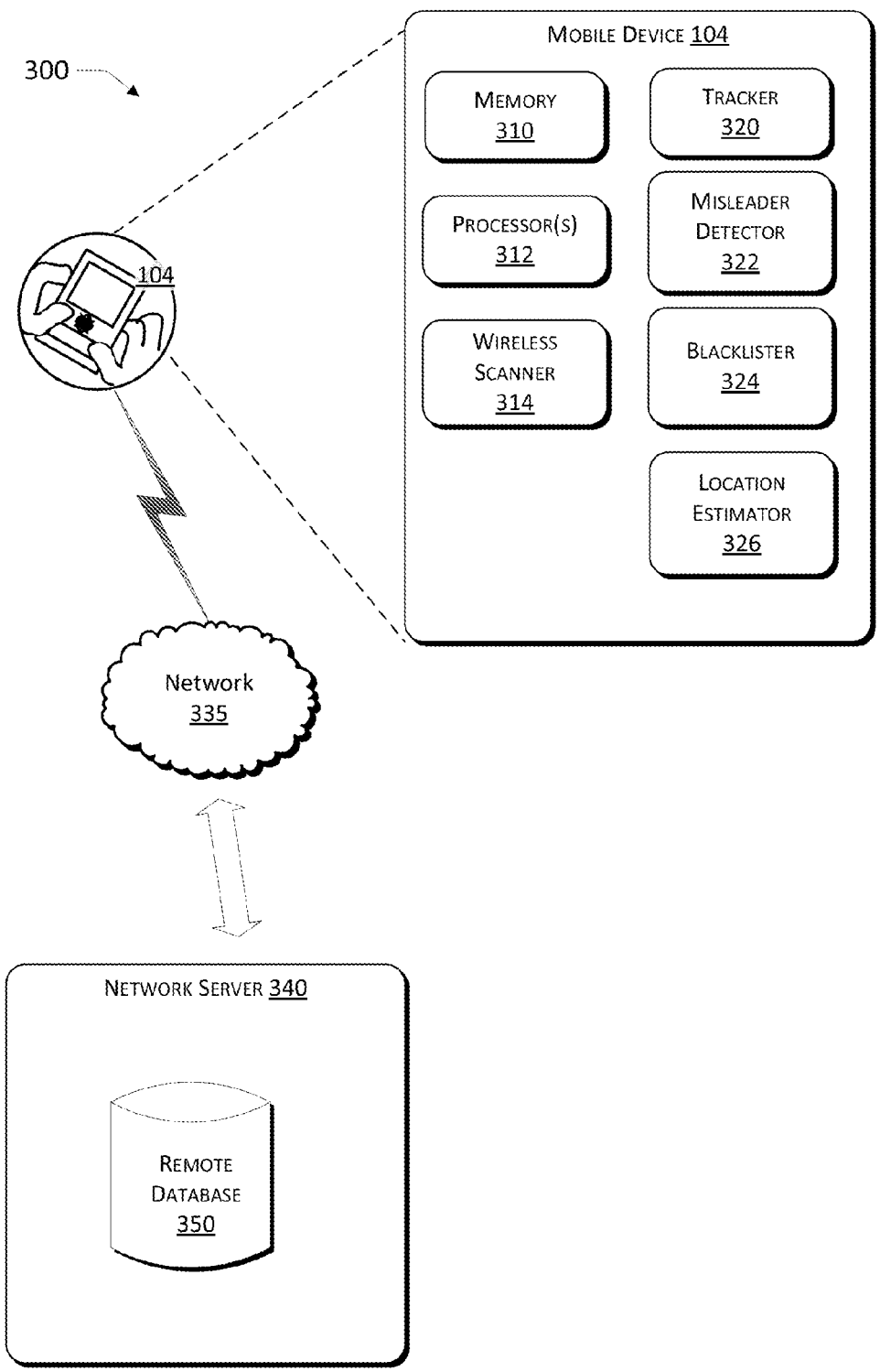
FIG. 3 illustrates an example system in accordance with one or more implementations described herein.

FIG. 3 illustrates example system 300 for implementing the technology described herein. The system 300 includes the mobile device 104, a network 335, and a network server 340.

The mobile device 104 includes a memory 310, one or more processor(s) 312, a wireless scanner 314, a tracker 320, misleading-IWS source detector 322, a blacklister 324, and a route/location estimator 326. These functional components may be separate or some combination of hardware units.

Alternatively, the components may be implemented, at least in part, in software and thus be stored in the memory 310 and executed by the processors 312.

The memory 310 may include its own local place/route database (akin to the to-be-described remote database 350). The local place/route database on the mobile device 104 stores valid IWS sources and/or a blacklist of misleading IWS sources.

The wireless scanner 314 periodically scans for ambient IWS sources. The tracker 320 helps identify the encountered ambient IWS sources and store them in the memory 310. When it encounters an ambient IWS source, the wireless scanner 314 detects that ambient IWS source and identifies its presumably unique identification (e.g., BSSID, MAC address, etc.).

The misleading-IWS-source detector 322 performs operations In accordance with Operation Table 1. For each WAP observed, the "misleader" detector 322 keeps an historical record of the values of N, C, and S. Based upon those records, the misleader detector 322 determines which IWS sources, if any, are misleading. When a misleading IWS source is identified, the blacklister 324 is informed.

The blacklister 324 may keep an actual blacklist of misleading IWS sources. Alternatively, the blacklister 324 may remove the misleading IWS sources from a whitelist of valid IWS sources. Furthermore, the blacklister 324 may update a network-based blacklist or whitelist.

When the location estimator 326 preforms a location or route estimation, it consults with the blacklist updated by the blacklister 324. If so, the location estimator 326 excludes the blacklisted IWS sources from the location or route estimation. If, instead of maintain an actual blacklist, the blacklister 324 updates a whitelist, then the location estimator 326 limits its estimation to the IWS source on the whitelist.

The network 335 may be a wired and/or wireless network. It may include the Internet infrastructure and it may be presented as the so-called "cloud." The network 335 may include wired or wireless local area network, a cellular network, and/or the like. The network 335 links the mobile device 104 with the network server 340.

The network server 340 provides assistance to the mobile device 104 as part of one or more implementations of the technology described herein. In some implementations, the network 335 and network server 340 are not utilized. That is, the mobile device 104 performs the implementations described herein without assistance of the network 335 or network server 340. The network server 340 may be one or more actual servers.

The network server 340 includes a remote IWS source database 350. The remote IWS source database 350 stores a collection of IWS sources datasets collected from the mobile device 104 and other networked mobile devices. The remote IWS database is updated based upon the blacklisted IWS sources identified by the blacklister 324.

The remote IWS source database 350 of a server may contain updates on blacklisted IWS sources from various devices. That is, the database 350 may be, at least in part, crowd-sourced. This database may be consulted by mobile device for cross-referencing ambient IWS sources to determine if they have already been identified as misleading or not.

Misleading IWS Source Detection Operation

Figure 4:
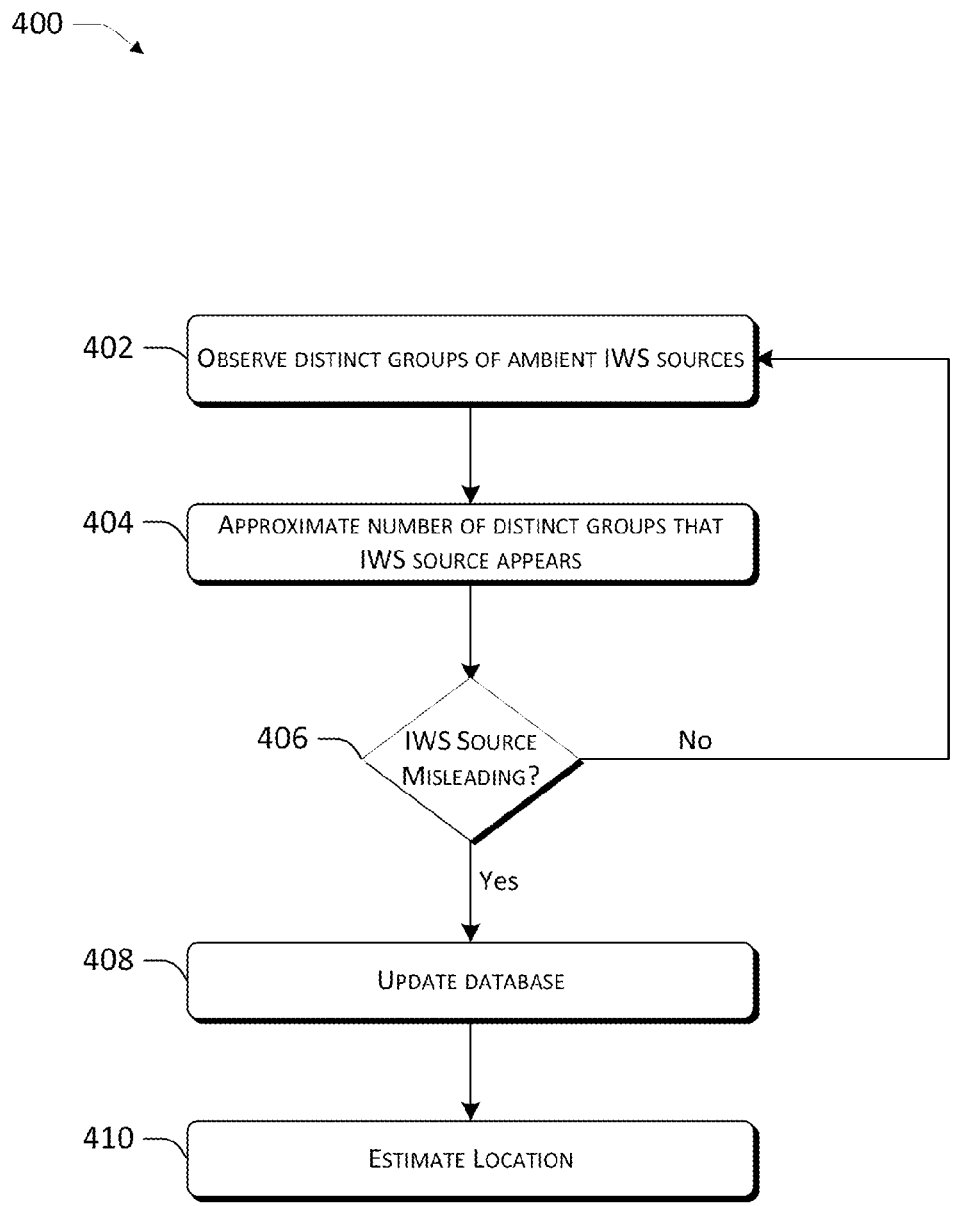
FIG. 4 illustrates an example process in accordance with one or more implementations described herein.

FIG. 4 illustrates an example process 400 for implementing, at least in part, the technology described herein. In particular, process 400 depicts an operation to detect misleading IWS sources. The process 400 is performed by, for example, the mobile device 104.

At 402, the mobile device 104 observes multiple distinct groups of ambient identifiable wireless signal (IWS) sources about a mobile device, wherein each group includes a collection of co-observed ambient IWS sources. As part of this operation, the mobile device 104 periodically scans for ambient IWS sources. The device detects, identifies, and records encountered ambient IWS sources.

At 404, the mobile device 104 approximates how many distinct groups in which each known IWS source appears. A particular IWS source "appears" in a group when is co-observed with other ambient IWS sources.

To approximate how many distinct groups in which a particular IWS source appears, the mobile device 104 does the following:

for each ambient IWS source co-observed with the particular IWS source, the device tracks a maximum number of ambient IWS sources that were co-observed with the particular IWS source;

the device calculates a weighted value of each ambient IWS source co-observed with the particular IWS source, the calculated weighted value of each ambient IWS source is the multiplicative inverse of its associated maximum value;

the device generates the approximate number of distinct groups that the particular IWS source appears by summing the calculated weighted value of the co-observed ambient IWS sources.

At 406, the mobile device 104 detects whether the particular IWS source is misleading based upon the approximate number of distinct groups. To detect a misleading IWS source, the device obtains a validity threshold (i.e., MAX_CLUSTERS of the Operation Table 1). It compares the approximate number of distinct groups that the particular IWS source appears to the validity threshold. Then the device determines whether the approximate number of distinct groups that the particular IWS source appears exceeds a validity threshold.

If the particular IWS source is determined to not misleading, then the process 400 returns to the beginning at block 402. If the particular IWS source is determined to be misleading, then the process proceeds to the next operation.

At 408, the mobile device 104 updates a database of IWS sources. To accomplish this, the device may blacklist the particular IWS source so as to exclude the particular IWS source from a location estimation. Alternatively, the device may update a whitelist of valid IWS sources by removing the blacklisted IWS source or by tagging the blacklisted IWS source in a manner so that it will not be used for location estimation.

In some implementations, the device transmits identifications of the blacklisted IWS sources over a network to a centralized database of blacklisted IWS sources. Alternatively, the device updates, over a network, a centralized database of valid IWS sources by removing or tagging misleading IWS sources.

At 410, the mobile device 104 performs a location or route estimation. The device estimates its location (or route) based upon observed IWS sources. However, the observed IWS sources upon which the location estimation is based are excluded the blacklisted IWS source.

Example Computing Device

Figure 5:
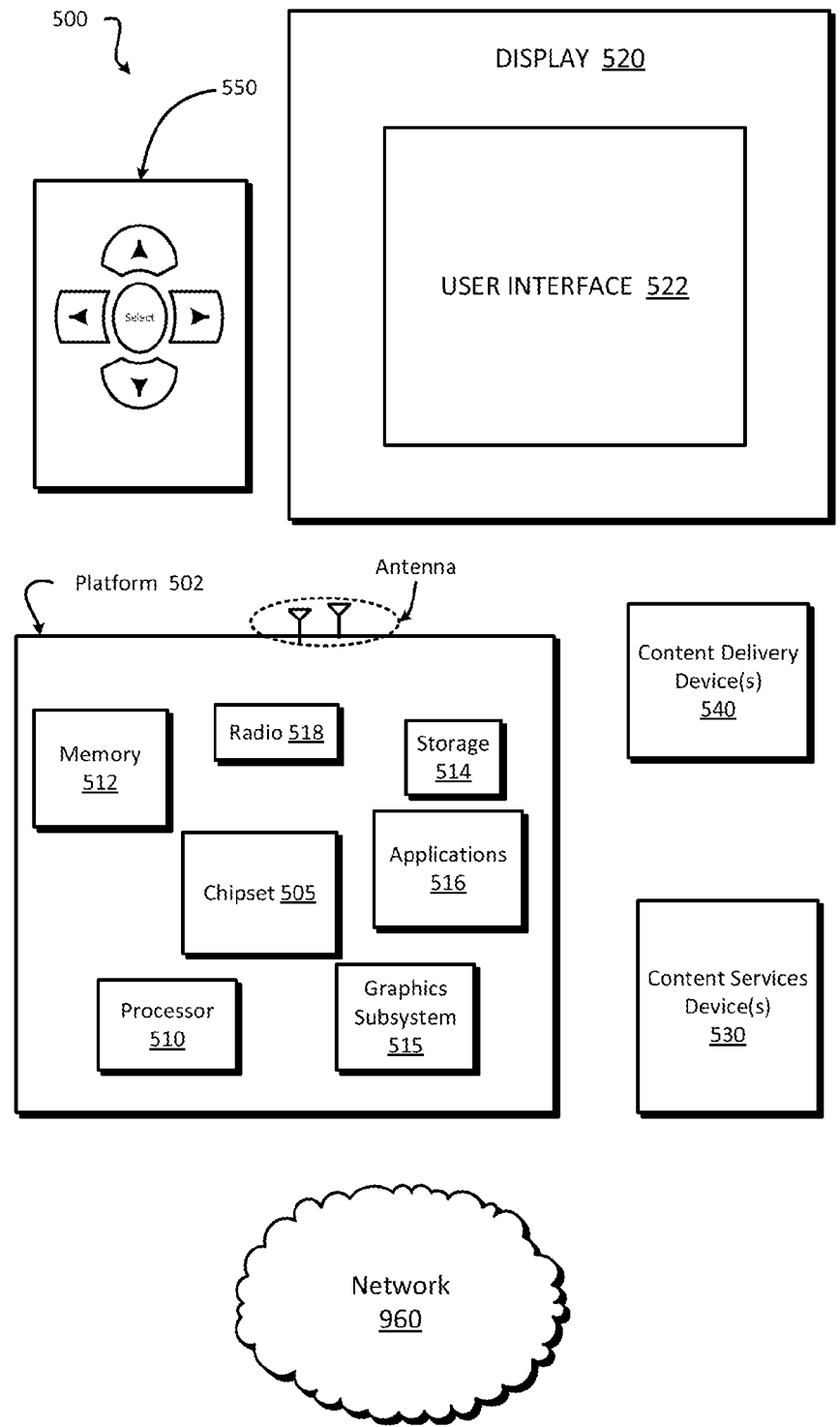
FIG. 5 illustrates an example computing device to implement in accordance with the technologies described herein.

FIG. 5 illustrates an example system 500 that may implement, at least in part, the technologies described herein. In various implementations, system 500 is a media system, although system 500 is not limited to this context. For example, system 500 can be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

In various implementations, system 500 includes a platform 502 coupled to a display 520. Platform 502 receives content from devices such as content services device 530, content delivery device 540, or other similar content sources. A navigation controller 550 including one or more navigation features may be used to interact with, for example, platform 502 and/or display 520.

In various implementations, platform 502 includes any combination of a chipset 505, a processor 510, memory 512, storage 514, a graphics subsystem 515, applications 516 and/or radio 518. Chipset 505 provides intercommunication among processor 510, memory 512, storage 514, graphics subsystem 515, application 516, and/or radio 518. For example, chipset 505 can include a storage adapter (not depicted) capable of providing intercommunication with storage 514.

Processor 510 may be implemented as a complex instruction set computer (CISC) or reduced instruction set computer (RISC) processors, x86 instruction set compatible processors, multicore, or any other microprocessor or central processing unit (CPU). In various implementations, processor 510 may be dual-core processors, dual-core mobile processors, and so forth.

Memory 512 may be implemented as a volatile memory device such as, but not limited to, a random access memory (RAM), dynamic random access memory (DRAM), or static RAM (SRAM).

Storage 514 may be implemented as a nonvolatile storage device such as, but not limited to, a magnetic disk drive, optical disk drive, tape drive, an internal storage device, an attached storage device, flash memory, battery backed-up synchronous DRAM (SDRAM), and/or a network accessible storage device. In various implementations storage 514 includes technology to increase the storage performance-enhanced protection for valuable digital media when multiple hard drives are included.

Graphics subsystem 515 processes of images such as still or video for display. Graphics subsystem 515 can be a graphics processing unit (GPU) or a visual processing unit (VPU), for example. An analog or digital interface may be used to communicatively couple the graphics subsystem 515 and the display 520. For example, the interface can be a high-definition multimedia interface, display port, wireless high definition media interface (HDMI), and/or wireless HD-compliant techniques. Graphics subsystem 515 may be integrated into processor 510 or chipset 505. In some implementations graphics subsystem 515 may be a stand-alone card communicatively coupled to chipset 505.

The graphics and/or video processing techniques described herein are implemented in various hardware architectures. For example, graphics and/or video functionality may be integrated within a chipset. Alternatively, a discrete graphics and/or a video processor may be used. As still another implementation, the graphics and/or video functions may be provided by a general-purpose processor, including a multicore processor. In further embodiments, the functions may be implemented in a consumer electronics device.

Radio 518 may include one or more radios capable of transmitting and receiving signals using various suitable wireless communications techniques. Such techniques involve communications across one or more wireless networks. Example wireless networks include, but are not limited to, wireless local area networks (WLANs), wireless personal area networks (WPANs), wireless metropolitan area network (WMANs), cellular networks, and satellite networks. In communicating across such networks, radio 518 operates in accordance with one or more applicable standards in any version.

In various implementations, display 520 includes any television-type monitor or display. Display 520 may include, for example, a computer display screen, touch-screen display, video monitor, television-like device, and/or a television. Display 520 can be digital and/or analog. In various implementations, display 520 may be a holographic display. In addition, display 520 may be a transparent surface that receives a visual projection. Such projections convey various forms of information, images, and/or objects. For example, such projections may be a visual overlay for a mobile augmented reality (MAR) application. Under the control of one or more software applications 516, platform 502 can display user interface 522 on display 520.

In various implementations, content services device(s) 530 may be hosted by any national, international, and/or independent service and thus accessible to platform 502 via the Internet. Content services device(s) 530 may be coupled to platform 502 and/or to display 520. Platform 502 and/or content services device(s) 530 may be coupled to a network 560 to communicate media information to and from the network 560. Content delivery device(s) 540 also may be coupled to platform 502 and/or to display 520.

In various implementations, content services device(s) 530 include a cable television box, personal computer, network, telephone, Internet-enabled devices, appliances capable of delivering digital information and/or content, and any other similar device capable of unidirectionally or bidirectionally communicating content between content providers and platform 502 and/display 520, via network 560 or directly. The content can be communicated unidirectionally and/or bidirectionally to and from any one of the components in system 500 and a content provider via a network 560. Examples of content include any media information including, for example, video, music, medical and gaming information, and so forth.

Content services device(s) 530 receive content such as cable television programming including media information, digital information, and/or other content. Examples of content providers include any cable or satellite television or radio or Internet content providers. The provided examples are not meant to limit implementations in accordance with the present disclosure in any way.

In various implementations platform 502 may receive control signals from navigation controller 550 having one or more navigation features. The navigation features of controller 550 may be used to interact with user interface 522, for example. In some embodiments, navigation controller 550 may be a pointing device such as a computer hardware component, specifically a human interface device, that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 can be replicated on a display (e.g., display 520) by movements of a pointer, cursor, focus ring, or other visual indicators displayed on the display. For example, under the control of software applications 516, the navigation features located on navigation controller 550 can be mapped to virtual navigation features displayed on user interface 522. In some embodiments, controller 550 may not be a separate component but may be integrated into platform 502 and/or display 520. The present disclosure, however, is not limited to the elements or in the context shown or described herein.

In various implementations, drivers (not shown) include technology to enable users to instantly turn on and off platform 502 like a television with the touch of a button after initial boot up, when enabled. Program logic allows platform 502 to stream content to media adaptors or other content services device(s) 530 or content delivery device(s) 540 even when the platform is turned off. In addition, chipset 505 includes hardware and/or software support for 5.1 surround sound audio and/or high definition 5.1 surround sound audio, for example. Drivers may include a graphics driver for integrated graphics platforms. In some embodiments the graphics driver may comprise a peripheral component interconnect (PCI) express graphics card.

In various implementations any one or more of the components shown in system 500 can be integrated. For example, platform 502 and content services device(s) 530 can be integrated, or platform 502 and content delivery device(s) 540 can be integrated, or platform 502, content services device(s) 530, and content delivery device(s) 540 can be integrated. In various embodiments, platform 502 and display 520 can be an integrated unit. Display 520 and content service device(s) 530 can be integrated, or display 520 and content delivery device(s) 540 can be integrated. These examples are not meant to limit the present disclosure.

In various embodiments system 500 can be implemented as a wireless system, a wired system, or a combination of both. When implemented as a wireless system, system 500 can include components and interfaces suitable for communicating over a wireless shared media, such as one or more antennae, transmitters, receivers, transceivers, amplifiers, filters, control logic, and so forth. An example of wireless shared media includes portions of a wireless spectrum, such as the RF spectrum. When implemented as a wired system, system 500 can include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media can include a wire, cable, metal leads, printed circuit board (PCB), backplane, switch fabric, semiconductor material, twisted-pair wire, coaxial cable, fiber optics, and others.

Platform 502 can establish one or more logical or physical channels to communicate information. The information includes media information and control information. Media information refers to any data representing content meant for a user. Examples of content include data from a voice conversation, videoconference, streaming video, electronic mail ("e-mail") message, voice-mail message, alphanumeric symbols, graphics, image, video, text, and so on. Data from a voice conversation can be, for instance, speech information, silence periods, background noise, comfort noise, tones, and other similar items. Control information refers to any data representing commands, instructions, or control words meant for an automated system. For example, control information can be used to route media information through a system, or instruct a node to process the media information in a predetermined manner. The embodiments, however, are not limited to the elements or in the context shown or described in FIG. 5.

As described above, system 500 can be embodied in varying physical styles or form factors. FIG. 5 illustrates implementations of a small form-factor device 500 in which system 500 can be embodied. In embodiments, for example, device 500 can be implemented as a mobile computing device having wireless capabilities. A mobile computing device may refer to any device having a processing system and a mobile power source or supply, such as one or more batteries.

Examples of a mobile computing device, in addition to those already mentioned, also may include computers that are arranged to be worn by a person, such as a wrist computer, finger computer, ring computer, eyeglass computer, belt-clip computer, arm-band computer, shoe computers, clothing computers, and other wearable computers. In various embodiments, a mobile computing device can be implemented as a smart phone capable of executing computer applications, as well as voice communications and/or data communications. Although some embodiments can be described with a mobile computing device, other embodiments can be implemented using other wireless mobile computing devices as well. The embodiments are not limited in this context.

Figure 6:
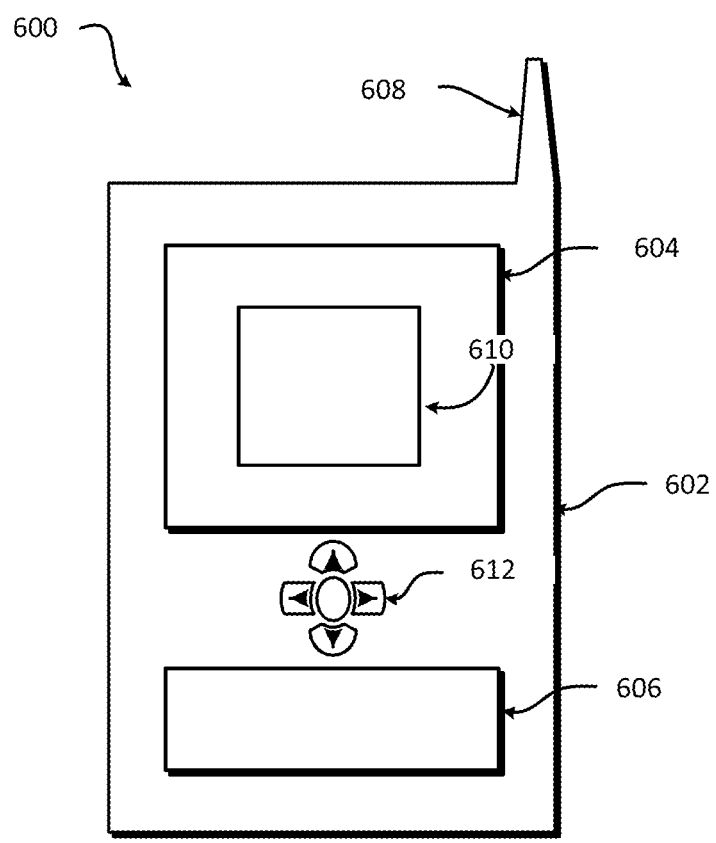
FIG. 6 illustrates an example device to implement in accordance with the technologies described herein.

As shown in FIG. 6, device 600 includes a housing 602, a display 604, an I/O device 606, and an antenna 608. Device 600 also includes navigation features 612. Display 604 includes any suitable display unit for displaying information appropriate for a mobile computing device. I/O device 606 includes any suitable I/O device for entering information into a mobile computing device. Examples for I/O device 606 include an alphanumeric keyboard, a numeric keypad, a touch pad, input keys, buttons, switches, rocker switches, microphones, speakers, voice recognition device and software, and others. Information also can be entered into device 600 by way of microphone (not shown). Such information is digitized by a voice recognition device (not shown). The embodiments are not limited in this context.

Various embodiments can be implemented using hardware elements, software elements, or a combination of both. Examples of hardware elements include processors, microprocessors, circuits, circuit elements (e.g., transistors, resistors, capacitors, inductors, etc.), integrated circuits, application specific integrated circuits (ASIC), programmable logic devices (PLD), digital signal processors (DSP), field programmable gate array (FPGA), logic gates, registers, semiconductor device, chips, microchips, chip sets, and more. Examples of software include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements varies in accordance with any number of factors, such as desired computational rate, power levels, heat tolerances, processing cycle budget, input data rates, output data rates, memory resources, data bus speeds, and other design or performance constraints.

One or more aspects of at least one embodiment can be implemented by representative instructions stored on a machine-readable medium that represents various logic within the processor, which when read by a machine causes the machine to fabricate logic to perform the techniques described herein. Such representations, known as "IP cores"

can be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present technology have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are demonstrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

Additional and Alternative Implementation Notes

Herein, a mobile device may be called a wireless device, handset, handheld device, or the like. In general, a mobile device is a small, hand-held, portable computing device that typically has a display screen and some user input mechanism (e.g., touch screen or keyboard). Often they weigh less than two pounds. Often, they are equipped with wireless communications capabilities, such as Wi-Fi, Bluetooth, and cellular. Examples of implementations of a mobile device include a smartphone, a tablet computer, a feature phone, a personal digital assistant (PDA), any wireless-enabled wearable devices, laptop computers, netbook computers, or other so-called handheld devices or computers.

While many of the implementations described herein are discussed in the context of Wi-Fi, the technology described herein applies to other wireless technologies that use identifiable wireless sources that are typically presumed to be non-moving and limited in size. Examples of such wireless technologies include Worldwide Interoperability for Microwave Access (WiMax), Global System for Mobile Communications (GSM), Time Division Multiple Access (TDMA), and other the Wi-Fi variants.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "computer-readable media" includes computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., RAM and ROM).

Example Implementations

The following examples pertain to further implementations.

In Example 1: A mobile device comprises:
  a tracker configured to observe multiple distinct groups of ambient identifiable wireless signal (IWS) sources about a mobile device, wherein each group includes a collection of co-observed ambient IWS sources;
  a misleading-IWS-source detector configured to:
  approximate how many distinct groups in which a particular IWS source appears;
  detect whether the particular IWS source is misleading based upon the approximate number of distinct groups;

a blacklister configured to, in response to the determining, blacklist the particular IWS source so as to exclude the particular IWS source from a location estimation.

In Example 2: The subject matter of Example 1 can optionally include wherein the tracker performs repeated wireless scans, each scan including:
  detecting ambient IWS sources;
  determining an identifier of the detected ambient IWS sources.

In Example 3: The subject matter of any one of above Examples starting with and including Example 1 can optionally include a location estimator configured to estimate a location of the mobile device based upon observed IWS sources, wherein the observed IWS sources upon which the location estimation is based excludes the blacklisted IWS source.

In Example 4: The subject matter of any one of above Examples starting with and including Example 1 can optionally include wherein the blacklister is configured to exclude the blacklisted IWS source from a database of valid IWS sources; while the mobile device further comprises a location estimator configured to estimate a location of the mobile device based upon observed IWS sources, wherein the observed IWS sources upon which the location estimation is based includes IWS sources found in the database of valid IWS sources.

In Example 5: The subject matter of any one of above Examples starting with and including Example 1 can optionally include wherein the misleading-IWS-source detector is further configured to, for the particular IWS source, record identities of other ambient IWS sources that are co-observed with the particular IWS source.

In Example 6: The subject matter of any one of above Examples starting with and including Example 1 can optionally include wherein the misleading-IWS-source detector is further configured to, for each ambient IWS source co-observed with the particular IWS source, track a maximum number of ambient IWS sources that were co-observed with the particular IWS source.

In Example 7: The subject matter of any one of above Examples starting with and including Example 1 can optionally include wherein the misleading-IWS-source detector is further configured to:
  for the particular IWS source, record identities of other ambient IWS sources that are co-observed with the particular IWS source;
  for each ambient IWS source co-observed with the particular IWS source, track a maximum number of ambient IWS sources that were co-observed with the particular IWS source;
  calculate a weighted value of each ambient IWS source co-observed with the particular IWS source, the calculated weighted value of each ambient IWS source is the multiplicative inverse of its associated maximum value;
  generate the approximate number of distinct groups that the particular
  IWS source appears by summing the calculated weighted value of the co-observed ambient IWS sources.

In Example 8: The subject matter of Example 7 can optionally include wherein the misleading-IWS-source detector is further configured to:
  obtain a validity threshold;
  compare the approximate number of distinct groups that the particular IWS source appears to the validity threshold;
  determine whether the approximate number of distinct groups that the particular IWS source appears exceeds a validity threshold.

In Example 9: The subject matter of any one of above Examples starting with and including Example 1 can optionally include wherein the blacklister is further configured to send an identification of the blacklisted IWS source over a network to a centralized database of blacklisted IWS sources.

In Example 10: The subject matter of any one of above Examples starting with and including Example 1 can optionally include wherein each IWS sources are identified by its basic service set identification (BSSID) or media access card (MAC) address.

In Example 11: The subject matter of any one of above Examples starting with and including Example 1 can optionally wherein the blacklisted IWS source is not unique identified; not stationary; and/or does not have a predictable range.

In Example 12: The subject matter of any one of above Examples starting with and including Example 1 can optionally wherein the blacklisted IWS source has an identity that is duplicative of another IWS source; is mobile; and/or does has a long-range that out of the norm for typical IWS sources.

In Example 13: One or more computer-readable media storing processor-executable instructions that when executed cause one or more processors to perform operations comprising:
  observing multiple distinct groups of ambient identifiable wireless signal (IWS) sources about a mobile device, wherein each group includes a collection of co-observed ambient IWS sources;
  approximating how many distinct groups in which a particular IWS source appears;
  detecting whether the particular IWS source is misleading based upon the approximate number of distinct groups;
  in response to the determining, blacklisting the particular IWS source so as to exclude the particular IWS source from a location estimation.

In Example 14: The subject matter of Example 13 can optionally include repeated scans, each scan including:
  detecting ambient IWS sources;
  determining an identifier of the detected ambient IWS sources.

In Example 15: The subject matter of Example 14 can optionally include operations which further comprise: estimating a location of the mobile device based upon observed IWS sources, wherein the observed IWS sources upon which the location estimation is based excludes the blacklisted IWS source.

In Example 16: The subject matter of any one of above Examples starting with and including Example 13, wherein the operations further comprise:
  excluding the blacklisted IWS source from a database of valid IWS sources;
  estimating a location of the mobile device based upon observed IWS sources, wherein the observed IWS sources upon which the location estimation is based includes IWS sources found in the database of valid IWS sources.

In Example 17: The subject matter of any one of above Examples starting with and including Example 13, wherein the approximating operation includes, for the particular IWS source, recording identities of other ambient IWS sources that are co-observed with the particular IWS source.

In Example 18: The subject matter of any one of above Examples starting with and including Example 13, wherein the approximating operation includes: for each ambient IWS source co-observed with the particular IWS source, tracking a maximum number of ambient IWS sources that were co-observed with the particular IWS source.

In Example 19: The subject matter of any one of above Examples starting with and including Example 13, wherein the approximating operation includes:
  for the particular IWS source, recording identities of other ambient IWS sources that are co-observed with the particular IWS source;
  for each ambient IWS source co-observed with the particular IWS source, tracking a maximum number of ambient IWS sources that were co-observed with the particular IWS source;
  calculating a weighted value of each ambient IWS source co-observed with the particular IWS source, the calculated weighted value of each ambient IWS source is the multiplicative inverse of its associated maximum value;
  generating the approximate number of distinct groups that the particular IWS source appears by summing the calculated weighted value of the co-observed ambient IWS sources.

In Example 20: The subject matter of Example 19 can optionally include one or more computer-readable media according to Example 19, wherein the detecting includes:
  obtaining a validity threshold;
  comparing the approximate number of distinct groups that the particular IWS source appears to the validity threshold;
  determining whether the approximate number of distinct groups that the particular IWS source appears exceeds a validity threshold.

In Example 21: The subject matter of any one of above Examples starting with and including Example 13, wherein the operations include transmitting an identification of the blacklisted IWS source over a network to a centralized database of blacklisted IWS sources.

In Example 22: The subject matter of any one of above Examples starting with and including Example 13, wherein each IWS sources are identified by its basic service set identification (BSSID) or media access card (MAC) address.

In Example 23: The subject matter of any one of above Examples starting with and including Example 13, wherein the blacklisted IWS source is not unique identified; not stationary; and/or does not have a predictable range.

In Example 24: The subject matter of any one of above Examples starting with and including Example 13, wherein the blacklisted IWS source has an identity that is duplicative of another IWS source; is mobile; and/or does has a long-range that out of the norm for typical IWS sources.

In Example 25: A method comprising:
  observing multiple distinct groups of ambient identifiable wireless signal (IWS) sources about a mobile device, wherein each group includes a collection of co-observed ambient IWS sources;
  approximating how many distinct groups in which a particular IWS source appears;
  detecting whether the particular IWS source is misleading based upon the approximate number of distinct groups;
  in response to the determining, blacklisting the particular IWS source so as to exclude the particular IWS source from a location estimation.

In Example 26: The subject matter of Example 25 can optionally include observing repeated scans, each scan including:
  detecting ambient IWS sources;
  determining an identifier of the detected ambient IWS sources.

In Example 27: The subject matter of any one of above Examples starting with and including Example 25, wherein the operations further comprise estimating a location of the mobile device based upon observed IWS sources, wherein the observed IWS sources upon which the location estimation is based excludes the blacklisted IWS source.

In Example 28: A method according to Example 25, wherein the operations further comprise:
  excluding the blacklisted IWS source from a database of valid IWS sources;
  estimating a location of the mobile device based upon observed IWS sources, wherein the observed IWS sources upon which the location estimation is based includes IWS sources found in the database of valid IWS sources.

In Example 29: The subject matter of any one of above Examples starting with and including Example 25, wherein the approximating operation includes:
for the particular IWS source, recording identities of other ambient IWS sources that are co-observed with the particular IWS source.

In Example 30: The subject matter of any one of above Examples starting with and including Example 25, wherein the approximating operation includes, for each ambient IWS source co-observed with the particular IWS source, tracking a maximum number of ambient IWS sources that were co-observed with the particular IWS source.

In Example 31: The subject matter of any one of above Examples starting with and including Example 25, wherein the approximating operation includes:
  for the particular IWS source, recording identities of other ambient IWS sources that are co-observed with the particular IWS source;
  for each ambient IWS source co-observed with the particular IWS source, tracking a maximum number of ambient IWS sources that were co-observed with the particular IWS source;
  calculating a weighted value of each ambient IWS source co-observed with the particular IWS source, the calculated weighted value of each ambient IWS source is the multiplicative inverse of its associated maximum value;
  generating the approximate number of distinct groups that the particular IWS source appears by summing the calculated weighted value of the co-observed ambient IWS sources.

In Example 32: The subject matter of any one of above Examples starting with and including Example 31, wherein the detecting includes:
  obtaining a validity threshold;
  comparing the approximate number of distinct groups that the particular IWS source appears to the validity threshold;
  determining whether the approximate number of distinct groups that the particular IWS source appears exceeds a validity threshold.

In Example 33: The subject matter of any one of above Examples starting with and including Example 25, wherein the operations include transmitting an identification of the blacklisted IWS source over a network to a centralized database of blacklisted IWS sources.

In Example 34: The subject matter of any one of above Examples starting with and including Example 25, wherein each IWS sources are identified by its basic service set identification (BSSID) or media access card (MAC) address.

In Example 35: The subject matter of any one of above Examples starting with and including Example 25, wherein the blacklisted IWS source is not unique identified; not stationary; and/or does not have a predictable range.

In Example 36: The subject matter of any one of above Examples starting with and including Example 25, wherein the blacklisted IWS source has an identity that is duplicative of another IWS source; is mobile; and/or does has a long-range that out of the norm for typical IWS sources.

In Example 37: A method comprising:
 observing multiple distinct groups of ambient identifiable wireless signal (IWS) sources about a mobile device, wherein each group includes a collection of co-observed ambient IWS sources;
 approximating how many distinct groups in which a particular IWS source appears;
 detecting whether the particular IWS source is misleading based upon the approximate number of distinct groups;
 in response to the determining, updating a database of valid IWS sources so as to exclude the particular IWS source that is determined to be misleading.

In Example 38: The subject matter of Example 37, can optionally include observing repeated scans, each scan including:
 detecting ambient IWS sources;
 determining an identifier of the detected ambient IWS sources.

In Example 39: The subject matter of any one of above Examples starting with and including Example 37, wherein the operations further comprise estimating a location of the mobile device based upon observed IWS sources, wherein the observed IWS sources upon which the location estimation is based only includes those IWS sources in the database of valid IWS sources.

In Example 40: The subject matter of any one of above Examples starting with and including Example 37, wherein the approximating operation includes, for the particular IWS source, recording identities of other ambient IWS sources that are co-observed with the particular IWS source.

In Example 41: The subject matter of any one of above Examples starting with and including Example 37, wherein the approximating operation includes, for each ambient IWS source co-observed with the particular IWS source, tracking a maximum number of ambient IWS sources that were co-observed with the particular IWS source.

In Example 42: The subject matter of any one of above Examples starting with and including Example 37, wherein the approximating operation includes:
 for the particular IWS source, recording identities of other ambient IWS sources that are co-observed with the particular IWS source;
 for each ambient IWS source co-observed with the particular IWS source, tracking a maximum number of ambient IWS sources that were co-observed with the particular IWS source;
 calculating a weighted value of each ambient IWS source co-observed with the particular IWS source, the calculated weighted value of each ambient IWS source is the multiplicative inverse of its associated maximum value;
 generating the approximate number of distinct groups that the particular IWS source appears by summing the calculated weighted value of the co-observed ambient IWS sources.

In Example 43: The subject matter of Example 42 where in the detecting can optionally include:
 obtaining a validity threshold;
 comparing the approximate number of distinct groups that the particular IWS source appears to the validity threshold;
 determining whether the approximate number of distinct groups that the particular IWS source appears exceeds a validity threshold.

In Example 44: The subject matter of any one of above Examples starting with and including Example 37, wherein each IWS sources are identified by its basic service set identification (BSSID) or media access card (MAC) address.

In Example 45: The subject matter of any one of above Examples starting with and including Example 37, wherein the excluded IWS source is not unique identified; not stationary; and/or does not have a predictable range.

In Example 46: The subject matter of any one of above Examples starting with and including Example 37, wherein the excluded IWS source has an identity that is duplicative of another IWS source; is mobile; and/or does has a long-range that out of the norm for typical IWS sources.

In Example 47: A method comprising:
 observing multiple distinct groups of ambient identifiable wireless signal (IWS) sources about a mobile device, wherein each group includes a collection of co-observed ambient IWS sources;
 approximating how many distinct groups in which a particular IWS source appears.

In Example 48: The subject matter of Example 47 can optionally include the method further comprising detecting whether the particular IWS source is misleading based upon the approximate number of distinct groups.

In Example 49: The subject matter of Example 48 can optionally include a method according to Example 48, the method further comprising, in response to the determining, updating a database of valid IWS sources so as to exclude the particular IWS source that is determined to be misleading.

In Example 50: The subject matter of any one of above Examples starting with and including Example 47, wherein the observing includes repeated scans, each scan including:
 detecting ambient IWS sources;
 determining an identifier of the detected ambient IWS sources.

In Example 51: The subject matter of any one of above Examples starting with and including Example 49, wherein the operations further comprise estimating a location of the mobile device based upon observed IWS sources, wherein the observed IWS sources upon which the location estimation is based only includes those IWS sources in the database of valid IWS sources.

In Example 52: The subject matter of any one of above Examples starting with and including Example 47, wherein the approximating operation includes, for the particular IWS source, recording identities of other ambient IWS sources that are co-observed with the particular IWS source.

In Example 53: The subject matter of any one of above Examples starting with and including Example, wherein the approximating operation includes, for each ambient IWS source co-observed with the particular IWS source, tracking a maximum number of ambient IWS sources that were co-observed with the particular IWS source.

In Example 54: A method according to Example 47, wherein the approximating operation includes:
- for the particular IWS source, recording identities of other ambient IWS sources that are co-observed with the particular IWS source;
- for each ambient IWS source co-observed with the particular IWS source, tracking a maximum number of ambient IWS sources that were co-observed with the particular IWS source;
- calculating a weighted value of each ambient IWS source co-observed with the particular IWS source, the calculated weighted value of each ambient IWS source is the multiplicative inverse of its associated maximum value;
- generating the approximate number of distinct groups that the particular IWS source appears by summing the calculated weighted value of the co-observed ambient IWS sources.

In Example 55: The subject matter of Example 54 can optionally include detecting whether the particular IWS source is misleading based upon the approximate number of distinct groups, wherein the detecting includes:
- obtaining a validity threshold;
- comparing the approximate number of distinct groups that the particular IWS source appears to the validity threshold;
- determining whether the approximate number of distinct groups that the particular IWS source appears exceeds a validity threshold.

What is claimed is:

1. A mobile device comprising:
   a tracker configured to observe multiple distinct groups of ambient identifiable wireless signal (IWS) sources about a mobile device, wherein each group includes a collection of co-observed ambient IWS sources;
   a misleading-IWS-source detector configured to:
   determine how many distinct groups in which a particular IWS source appears, wherein the determination includes the misleading-IWS-source detector being configured to:
   for each ambient IWS source co-observed with the particular IWS source, track a maximum number of ambient IWS sources that were co-observed with the particular IWS source;
   calculate a weighted value of each ambient IWS source co-observed with the particular IWS source, the calculated weighted value of each ambient IWS source being the multiplicative inverse of its associated maximum value;
   generate the determined number of distinct groups that the particular IWS source appears by summing the calculated weighted value of the co-observed ambient IWS sources;
   obtain a validity threshold that indicates a stationary, uniquely identified, and a low-range IWS source, wherein a reception range of a low-range IWS source is 300 feet or less;
   detect whether the particular IWS source is misleading based upon a comparison of the determined number of distinct groups in which the particular IWS source appeared, to the validity threshold;
   a blacklister configured to, in response to the detecting, blacklist the particular IWS source so as to exclude the particular IWS source from a location estimation.

2. A mobile device according to claim 1, further comprising:
   a location estimator configured to estimate a location of the mobile device based upon observed IWS sources, wherein the observed IWS sources upon which the location estimation is based excludes the blacklisted IWS source.

3. A mobile device comprising:
   a tracker configured to observe multiple distinct groups of ambient identifiable wireless signal (IWS) sources about a mobile device;
   a misleading-IWS-source detector configured to:
   record, for a particular ambient IWS source in a particular group, identities of other ambient IWS sources that are co-observed with the particular IWS source;
   for each ambient IWS source co-observed with the particular IWS source, track a maximum number of ambient IWS sources that were co-observed with the particular IWS source;
   calculate a weighted value of each ambient IWS source co-observed with the particular IWS source, the calculated weighted value of each ambient IWS source being the multiplicative inverse of its associated maximum value;
   determine a number of distinct groups that the particular IWS source appears by summing the calculated weighted value of the co-observed ambient IWS sources;
   determine whether the determined number of distinct groups that the particular IWS source appears exceeds a validity threshold;
   a blacklister configured to, in response to the determining, blacklist the particular IWS source so as to exclude the particular IWS source from a location estimation.

4. A mobile device according to claim 3, wherein the misleading-IWS-source detector is further configured to:
   obtain the validity threshold that includes an adjustable threshold.

5. One or more non-transitory computer-readable media storing processor-executable instructions that when executed cause one or more processors to perform operations comprising:
   observing multiple distinct groups of ambient identifiable wireless signal (IWS) sources about a mobile device, wherein each group includes a collection of co-observed ambient IWS sources;
   determining how many distinct groups in which a particular IWS source appears, wherein the determining further includes:
   for the particular IWS source, recording identities of other ambient IWS sources that are co-observed with the particular IWS source;
   for each ambient IWS source co-observed with the particular IWS source, tracking a maximum number of ambient IWS sources that were co-observed with the particular IWS source;
   calculating a weighted value of each ambient IWS source co-observed with the particular IWS source, the calculated weighted value of each ambient IWS source being the multiplicative inverse of its associated maximum value;
   generating the determined number of distinct groups that the particular IWS source appears by summing the calculated weighted value of the co-observed ambient IWS sources obtaining a validity threshold;

detecting whether the particular IWS source is misleading based upon a comparison of the determined number of distinct groups to the validity threshold;

in response to the detecting, blacklisting the particular IWS source so as to exclude the particular IWS source from a location estimation.

6. One or more non-transitory computer-readable media according to claim 5, the observing includes repeated scans, each scan including:

detecting ambient IWS sources;

determining an identifier of the detected ambient IWS sources.

7. One or more non-transitory computer-readable media according to claim 5, wherein the operations further comprise:

estimating a location of the mobile device based upon observed IWS sources, wherein the observed IWS sources upon which the location estimation is based excludes the blacklisted IWS source.

8. One or more non-transitory computer-readable media according to claim 5, wherein the operations further comprise:

excluding the blacklisted IWS source from a database of valid IWS sources;

estimating a location of the mobile device based upon observed IWS sources, wherein the observed IWS sources upon which the location estimation is based includes IWS sources found in the database of valid IWS sources.

9. One or more non-transitory computer-readable media according to claim 5, wherein the determining how many distinct groups operation includes:

for the particular IWS source, recording identities of other ambient IWS sources that are co-observed with the particular IWS source.

10. One or more non-transitory computer-readable media according to claim 5, wherein the determining how many distinct groups operation includes:

for each ambient IWS source co-observed with the particular IWS source, tracking a maximum number of ambient IWS sources that were co-observed with the particular IWS source.

11. One or more non-transitory computer-readable media according to claim 5, wherein the operations include transmitting an identification of the blacklisted IWS source over a network to a centralized database of blacklisted IWS sources.

12. One or more non-transitory computer-readable media according to claim 5, wherein each IWS sources are identified by its basic service set identification (BSSID) or media access card (MAC) address.

13. One or more non-transitory computer-readable media according to claim 5, wherein the blacklisted IWS source is not unique identified; not stationary; and/or does not have a predictable range.

14. One or more non-transitory computer-readable media according to claim 5, wherein the blacklisted IWS source has one or more properties selected from a group consisting of an identity that is duplicative of another IWS source; is mobile; and has a reception range greater than 300 feet.

15. A method comprising:

observing multiple distinct groups of ambient identifiable wireless signal (IWS) sources about a mobile device, wherein each group includes a collection of co-observed ambient IWS sources;

determining how many distinct groups in which a particular IWS source appears, the determining how many distinct group operation includes:

for the particular IWS source, recording identities of other ambient IWS sources that are co-observed with the particular IWS source;

for each ambient IWS source co-observed with the particular IWS source, tracking a maximum number of ambient IWS sources that were co-observed with the particular IWS source;

calculating a weighted value of each ambient IWS source co-observed with the particular IWS source, the calculated weighted value of each ambient IWS source being the multiplicative inverse of its associated maximum value;

generating the determined number of distinct groups that the particular IWS source appears by summing the calculated weighted value of the co-observed ambient IWS sources;

obtaining a validity threshold that indicates a stationary, uniquely identified, and a low-range IWS source, wherein a reception range of a low-range IWS source is 300 feet or less;

detecting whether the particular IWS source is misleading based upon a comparison of the determined number of distinct groups in which the particular IWS source appeared, to the validity threshold;

in response to the detecting, updating a database of valid IWS sources so as to exclude the particular IWS source that is determined to be misleading.

16. A method according to claim 15, wherein the operations further comprise:

estimating a location of the mobile device based upon observed IWS sources, wherein the observed IWS sources upon which the location estimation is based only includes those IWS sources in the database of valid IWS sources.

17. A method according to claim 15, wherein the validity threshold includes an adjustable threshold.

18. A mobile device according to claim 1, wherein each IWS sources are identified by its basic service set identification (BSSID) or media access card (MAC) address.

19. A mobile device according to claim 1, the validity threshold includes an adjustable validity threshold.

* * * * *